(12) United States Patent
Kruys

(10) Patent No.: US 7,292,645 B2
(45) Date of Patent: Nov. 6, 2007

(54) BINARY TRANSMITTER AND METHOD OF TRANSMITTING DATA IN BINARY FORMAT

(75) Inventor: Jan P. Kruys, Harmelen (NL)

(73) Assignee: Agere Systems Inc., Allentown, PA (US)

( * ) Notice: Subject to any disclaimer, the term of this patent is extended or adjusted under 35 U.S.C. 154(b) by 930 days.

(21) Appl. No.: 10/153,380

(22) Filed: May 24, 2002

(65) Prior Publication Data

US 2003/0016760 A1 Jan. 23, 2003

Related U.S. Application Data

(60) Provisional application No. 60/294,064, filed on May 29, 2001.

(51) Int. Cl.
*H04L 27/10* (2006.01)

(52) U.S. Cl. ............ 375/272; 375/279; 375/303; 375/146

(58) Field of Classification Search .......... 375/141, 375/146, 219, 220, 222, 259, 269, 272, 279, 375/295, 298, 303, 308; 341/51; 332/169
See application file for complete search history.

(56) References Cited

U.S. PATENT DOCUMENTS

| | | | | |
|---|---|---|---|---|
| 4,995,053 A | * | 2/1991 | Simpson et al. ............ 375/130 |
| 5,136,614 A | * | 8/1992 | Hiramatsu et al. ........... 375/141 |
| 5,537,398 A | * | 7/1996 | Siwiak ....................... 370/204 |
| 5,764,699 A | * | 6/1998 | Needham et al. ............ 375/261 |
| 6,014,411 A | | 1/2000 | Wang |
| 6,208,663 B1 | * | 3/2001 | Schramm et al. ............ 370/465 |
| 6,456,221 B2 | * | 9/2002 | Low et al. ................... 341/157 |
| 6,629,121 B1 | * | 9/2003 | Ishikawa et al. ............. 708/815 |
| 6,781,980 B1 | * | 8/2004 | Dajer et al. ................. 370/342 |
| 6,792,050 B1 | * | 9/2004 | Shiikuma et al. ............ 375/300 |
| 6,813,319 B1 | * | 11/2004 | Nagle et al. ................. 375/302 |
| 6,909,758 B2 | * | 6/2005 | Ramesh et al. ............. 375/340 |
| 6,996,158 B2 | * | 2/2006 | Bradley ....................... 375/148 |

* cited by examiner

*Primary Examiner*—Dac V. Ha

(57) ABSTRACT

The present invention provides a binary transmitter. In one embodiment, the binary transmitter includes a data coder that receives and encodes binary data to be transmitted and a modulator that employs the binary data directly to modulate a carrier wave to yield a stream of broadband RF signals. Also, the binary transmitter includes a header generator that interposes header information into the stream and an RF amplifier that amplifies the stream for transmission via an antenna. A method of transmitting data and a wireless data communication system incorporating the transmitter or the method are also disclosed.

20 Claims, 2 Drawing Sheets

FIG. 3

| ON | OFF | ON | OFF | ON | OFF | ON | OFF | ON | OFF | ON | OFF | ON | OFF | ON | OFF |
|---|---|---|---|---|---|---|---|---|---|---|---|---|---|---|---|
| 32 | 32 | 32 | 32 | 16 | 16 | 16 | 16 | 8 | 8 | 8 | 8 | 2 | 2 | 2 | 2 |

FIG. 4

| OFF | ON | OFF |
|---|---|---|
| 32 | nn | 32 |

FIG. 5

| OFF | ON | OFF |
|---|---|---|
| 32 | nn | 32 |

FIG. 6

| OFF | ON/OFF | ON/OFF | ON/OFF | ON/OFF | ON/OFF | OFF |
|---|---|---|---|---|---|---|
| 32 | nn | nn | nn | nn | nn | nn |

BINARY TRANSMITTER AND METHOD OF TRANSMITTING DATA IN BINARY FORMAT

CROSS-REFERENCE TO RELATED APPLICATION

This Application claims the benefit of U.S. Provisional Application Ser. No. 60/294,064, filed on May 29, 2001, and entitled "High Speed Binary Transmission System," commonly assigned with the present invention and incorporated herein by reference.

TECHNICAL FIELD OF THE INVENTION

The present invention is directed, in general, to data transmission and, more specifically, to a binary transmitter, a method of transmitting data in binary format, and a wireless data communication system incorporating the transmitter or the method.

BACKGROUND OF THE INVENTION

Wireless data transmission, in its broadest manifestation, has long been a beneficial means by which to transfer information from one location to a distant location. For example, broadcasts transmitted using radio frequency (RF) signals have delivered audio and video programming and similar information to distant locations for decades. As the transfer of information continues its stampede to becoming one of the most valuable commodities in the world, the high-speed transmission of tremendous amounts of data is becoming more essential to the everyday function of many companies. In addition, the desire to avoid the movement restrictions associated with hard-wired network connections, for example, land-based telephone lines or cable jacks, presents an even greater challenge for high-speed data transmission networks.

As a result, high-speed wireless data transfer has quickly become a highly profitable field of technology, with each competitor seeking the fastest data transfer capabilities, along with the fewest possible errors in the data stream. The traditional approach to wireless data transfer has been to employ RF signals to transmit the data from a transmitter to a distant receiver. With this conventional approach, data is first converted to an analog format so that it may be transmitted using RF signals. The data is then transmitted to a receiver by modulating the analog data on an RF carrier wave, amplifying the signal, and transmitting the signal to a waiting receiver. The receiver receiving the data signal demodulates the RF signal to extract the analog data stream, and forwards the data for conversion back to a binary format so that it may be used as desired.

However, when the data to be transmitted is in binary format, as is the case with data such as computer data, special components designed to convert the data from binary to analog and back to binary format for modulation and demodulation, respectively, is required. More specifically, complex circuitry for such a task is required, typically increasing the overall manufacturing costs of data transmission devices. Moreover, as the complexity of the circuitry increases, which is often the case as data transmission speed is increased in an analog transmission system, the cost and volume of the circuitry also increase. Also, the quality of the transmission system components is often required to be higher to reduce errors during high-speed data transfer of such modulated analog signals. Still further, such high-quality and complex circuitry tends to be difficult to design and power-consumptive, both of which further increase overall manufacturing and operational expense.

Accordingly, what is needed in the art is a high-speed data transmission system for wireless transmission of data that does not suffer from the deficiencies associated with prior art transmission systems.

SUMMARY OF THE INVENTION

To address the above-discussed deficiencies of the prior art, the present invention provides a binary transmitter. In one embodiment, the binary transmitter includes a data coder that receives and encodes binary data to be transmitted and a modulator that employs the binary data directly to modulate a carrier wave to yield a stream of broadband RF signals. Also, the binary transmitter includes a header generator that interposes header information into the stream and an RF amplifier that amplifies the stream for transmission via an antenna.

In another aspect, the present invention provides a method of transmitting data. In one embodiment, the method includes receiving and encoding binary data to be transmitted and employing the binary data directly to modulate a carrier wave to yield a stream of broadband RF signals. These broadband RF signals may take the form of periods where the transmitter is ON (representing a binary ONE) and periods where the transmitter is off (representing a binary ZERO). However, other schemes, such as using different frequencies or different phases of the carrier wave, may be used to impress the logical ONEs and logical ZEROs upon the carrier wave. In addition, the method includes interposing header information into the stream and amplifying the stream for transmission via an antenna.

In yet another aspect, the present invention provides a wireless data communication system. In one embodiment, the wireless data communication system comprises a first transceiver that includes a transmitter having a modulator that employs binary data directly to modulate a carrier wave to yield a stream of broadband RF signals for RF signal transmission and a header generator that interposes header information regarding the carrier wave into the stream. In addition, the wireless data communication system further comprises a second transceiver that includes a receiver having a synchronizer that receives the stream and interprets the header information to configure a demodulator to demodulate the stream, based on the header information, to yield the binary data.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following detailed description taken in conjunction with the accompanying FIGS. It is emphasized that various features may not be drawn to scale. In fact, the dimensions of various features may be arbitrarily increased or reduced for clarity of discussion. In addition, it is emphasized that some circuit components may not be illustrated for clarity of discussion. Reference is now made to the following descriptions taken in conjunction with the accompanying drawings, in which:

FIG. 3 illustrates one embodiment of a slot sequence employed by a transmitter sending a binary data stream during a training sequence with a receiver, in accordance with the principles of the present invention;

FIG. 4 illustrates one embodiment of a sequence establishing the signaling rate field between a transmitter and a receiver for a particular data transmission that is to occur;

FIG. 5 illustrates one embodiment of a sequence establishing the coding control field between a transmitter and a receiver for a particular data transmission; and FIG. 6 illustrates one embodiment of a slot pattern that may be used to establish a data signaling field, in accordance with the present invention, between a transmitter and a receiver.

DETAILED DESCRIPTION

Figure 1:
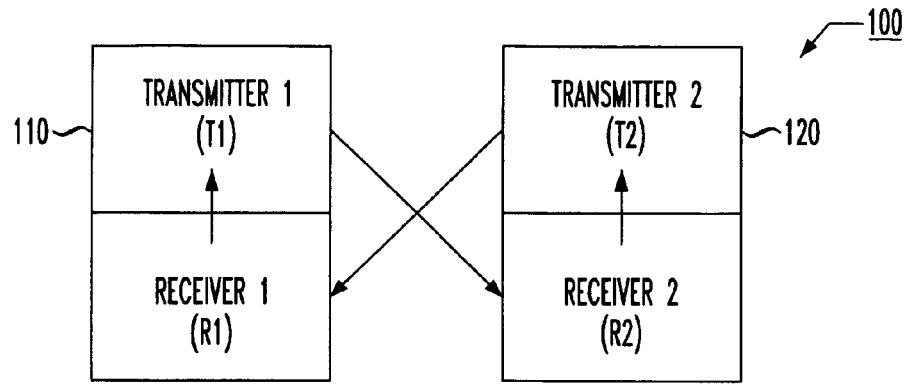
FIG. 1 illustrates one embodiment of an intercommunication between transceivers constructed according to the principles of the present invention.

Referring initially to FIG. 1, illustrated is one embodiment of an intercommunication between first and second transceivers 110, 120 constructed according to the principles of the present invention. In accordance with the principles described herein, direct binary data transfer via RF signals is carried out between the two transceivers 110, 120, rather than relying on analog data transmissions. As used herein, the phrase "direct binary data transfer" is defined as modulation of an RF carrier by a binary signal, such that the digital data is directly impressed upon the RF carrier. This is contrasted with the conventional process of converting the binary data into analog form and thereafter modulating an RF carrier using the analog form.

As illustrated, each transceiver 110, 120 includes its own transmitter T1, T2 and receiver R1, R2, respectively. Thus, an adaptive feedback system, in accordance with the principles disclosed herein, may be employed to simplify the circuitry employed in each transceiver 110, 120, as well as increase the overall efficiency of data transmissions between the transceivers 110, 120. More specifically, in conventional data transmission systems, binary data to be transmitted via RF signals from one place to another are first converted to analog data, and only then employed to modulate an RF carrier of a given frequency for transmission. As discussed above, however, such analog transmission systems often require extremely complex circuitry in the transceivers employed therein. This is especially true in the case of analog receivers, which typically require complex and expensive circuitry to facilitate the demodulation of high-speed analog data transmissions.

In contrast, a data communication system incorporating transceivers constructed according to the principles of the present invention provides a means for directly transmitting data, via RF signals, in binary form. The present invention provides transceivers capable of such direct binary data transmission by providing a transmitter in a first transceiver that encodes the binary data with transmission parameters, and then communicating with a receiver in another transceiver to ensure the established parameters are suitable for the receiver's capabilities. For instance, before a data transmission is commenced from the transmitter T1 in the first transceiver 110 to the receiver R2 in the second transceiver 120, a "training sequence" between the transmitter T1 and receiver R2 is used to establish a number of transmission parameters to increase the efficiency of the data transmission.

For example, the encoded signaling rate by which the data is to be transmitted is established between the transmitter T1 and the receiver R2. In addition, the type of coding employed on the data, for example, convolutional or turbo coding, may also be established between the two. For an exemplary overview of turbo coding, see U.S. Pat. No. 6,014,411 entitled "Repetitive Turbo Coding Communication Method" to Charles C. Wang. Moreover, the amount of data to be transmitted, as well as the length of the data stream, may be established before transmission commences. Examples of how the transceivers 110, 120 of the present invention accomplish this training sequence will be set forth in greater detail below.

Irrespective of how the parameters are established, the adaptive feedback of the training sequence between the transmitter of one transceiver and the receiver of another provides the transceivers the opportunity to communicate back-and-forth before data transmission commences, to establish not only the type of encoding placed on the data, but also the size and optimum transmission rate of the data. In the illustrated embodiment, when the receiver R2 in the second transceiver 120 sends back a "response" to information sent by the first transmitter T1, it communicates with the second transmitter T2, located in the same transceiver 120, so that the transmitter T2 transmits the response to the first transceiver 110. Then, the receiver R1 in the first transceiver 110 receives the response and communicates the results of the response to the first transmitter T1. The transmitter T1 may then adjust one or more transmission parameters based on the response of the second transceiver 120, or may begin data transmission once it receives word that the data transmission parameters are established and optimized.

Moreover, the transceivers 110, 120 of the present invention may be employed in a large number of applications. An exemplary application is the implementation of the transceivers 110, 120 in a local area network (LAN), however the present invention is not so limited. In other embodiments, the first transceiver may be located in a first computer, while the second transceiver 120 is located in a second computer. In such an embodiment, the transceivers 110, 120 would be employed to directly transmit binary data between the two computers. Those who are skilled in the art will understand that a transceiver constructed according to the present invention is not limited to use in computers; rather they may be employed in any situation where direct binary data transmission is desired. A closer look at the components of a transceiver of the present invention, and how those components facilitate direct binary data transfer using RF signals, will now be discussed with reference to FIGS. 2-6.

Figure 2:
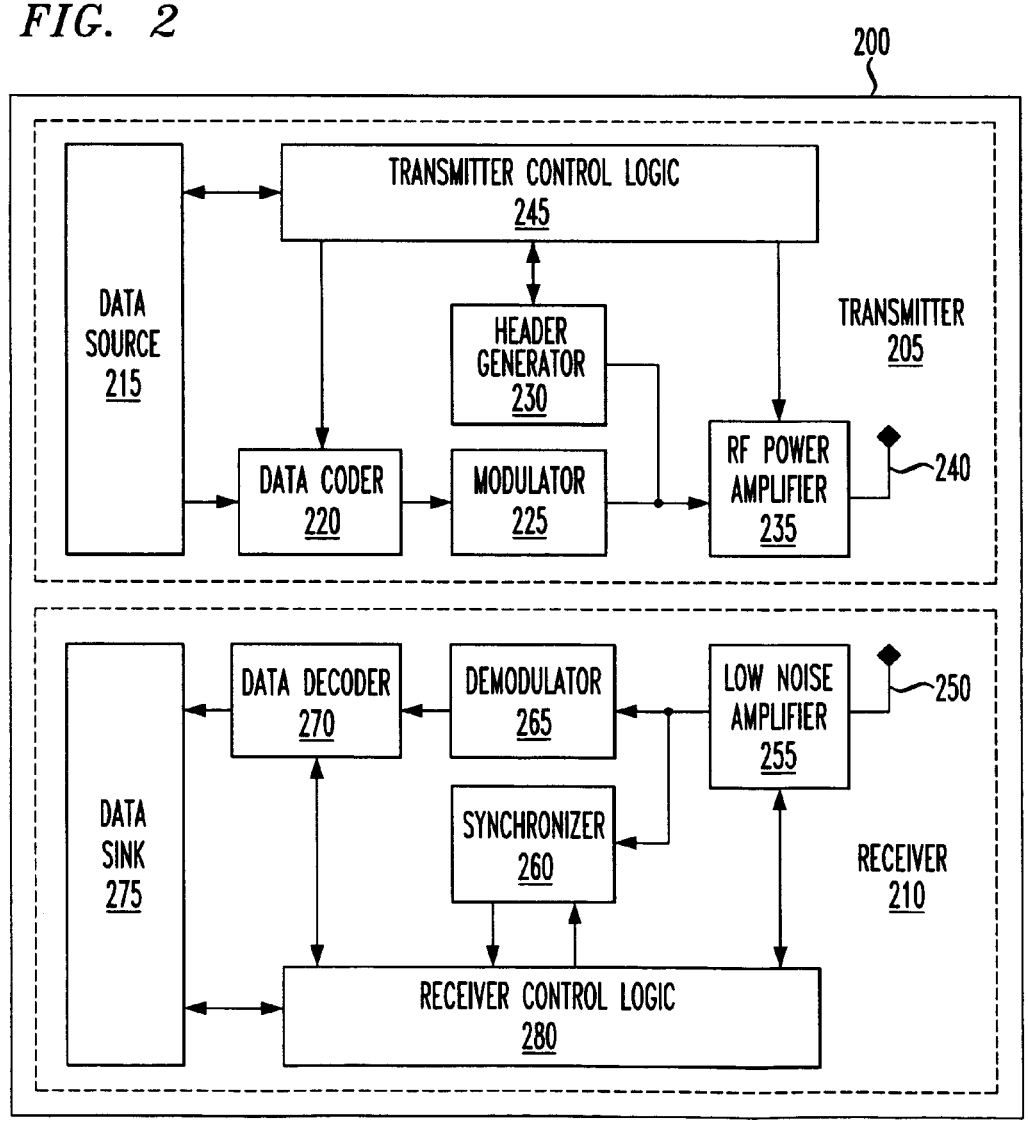
FIG. 2 illustrates one embodiment of a transceiver constructed according to the principles of the present invention.

Turning now to FIG. 2, illustrated is one embodiment of a transceiver 200 constructed according to the principles of the present invention. The transceiver 200 includes a transmitter 205 for transmitting RF signals carrying binary data, and a receiver 210 for receiving the transmitted RF signals. Accordingly, the transceiver 200 may be used in conjunction with another similar transceiver, as is illustrated in FIG. 1, for direct transfer of data in binary format between the transceivers using RF signals.

The transmitter 205 includes a data source 215. The data source 215 is configured to receive data, in a binary format, from external components, devices, or systems, coupled to the transceiver 200. For example, the data source 215 may include a file from a computer, a digital stream from a digital video device, or even a digital picture from a digital camera. In short, the data source 215 may provide any type of data for transmission by the transceiver 200 to a remote transceiver, so long as the data is in binary format. Those who are skilled in the art understand the components that may be included in the data source 215, so that discussion will not be repeated here. Once the data source 215 has established what binary data is to be transmitted, the binary data is sent to a data coder 220.

The data coder 220 establishes the transmission parameters, as mentioned above, and generates a code for the binary data having these parameters, or as a function of the parameters, as the case may be. For example, the data coder 220 may generate a code having a signaling rate, transmission rate, the size of the binary data, and the type of coding to be used to actually encode the data for transmission. Of course, other parameters may also be generated, and the present invention is not limited to any particular parameters. Additionally, in a specific embodiment, the data coder 220 encodes the binary data bit-for-bit. The specific means by which the data coder 220 encodes such transmission parameters will be discussed in greater detail with references to FIGS. 3-6. Once the data coder 220 has generated the appropriate transmission parameters, the data coder 220 sends the binary data to a modulator 225.

The modulator 225 may be a conventional modulator configured to directly modulate the desired binary data onto an RF carrier wave. However, unlike conventional transceivers, the modulator 225 directly modulates the data using a binary modulation scheme to generate a broadband RF transmission or sequence of such transmissions in the form of broadband RF signals, in accordance with the principles of the present invention. As used herein, "broadband RF signals" are defined as RF pulses that carry a broadband digital signal. The RF signals are broadband because the data being used (i.e., modulated) to create the resulting RF signals are broadband signals themselves.

The modulator 225 may achieve a binary modulation of the data by, for example, switching the transmitter 205 on and off, where ON would represent a ONE bit and OFF would represent a ZERO bit. In an alternative embodiment, the modulator 225 may directly modulate the binary data by employing "frequency modulation", where the frequency at which the transmitter 205 is broadcasting is fluctuated such that one frequency of the transmitter would represent a ONE bit and another frequency would represent a ZERO bit. In yet another embodiment, the modulator 225 may directly modulate the binary data by employing "phase modulation", where the phase of the transmitted signal may be adjusted to achieve a binary modulation of the data signal such that one phase of the transmitted signal would represent a ONE bit whereas another phase would represent a ZERO bit. Those who are skilled in the art may understand such exemplary binary modulation schemes under various other names, such as "frequency shift keying", "phase shift keying" or the like, and the present invention is broad enough to encompass all such binary modulation scheme, regardless of the name used for each scheme. In addition, those who are skilled in the art understand well other binary modulation schemes by which the modulator 225 may directly modulate the binary data and generate a stream of broadband RF signals, so the intricacies of every such scheme will not be explored here.

The carrier wave on which the modulator 225 prepares the data for transmission may be at any frequency. In an advantageous embodiment of the present invention, the frequency of the carrier wave is about 60 GHz. With such a frequency, a consumer employing a transceiver constructed according to the present invention may make use of the unlicensed band of about 59 to 63 GHz, which is currently an unlicensed band. Of course, the transceiver 200 need not be limited to operating only in this unlicensed frequency band, and may be configured to operate within any frequency band desired.

Before the modulated binary data stream is transmitted by the transmitter 205, a header generator 230 interposes header information into the stream. More specifically, in an exemplary embodiment, the header generator 230 interposes transmission parameter information into the data stream by appending a header to the data. For example, the parameter information may include the signaling rate established previously, as well as the length of the data, the type of coding technique the data coder 220 employed to encode the binary data for transmission, and any other protocols sought to be established between the transmitter 205 and the receiver receiving the data stream. In addition, the header generator 230 injects source and destination address information into the data stream.

Once the binary modulation by the modulator 225 has begun and the header generator 230 has appended the appropriate header information, the modulated binary data stream is sent to an RF amplifier 235 that amplifies the stream for transmission via an antenna 240. In one embodiment, the power amplifier 235 is a Class C amplifier, however the present invention is not limited to any particular type of amplifier. In a related embodiment, the antenna 240 is a broadband antenna, capable of transmitting and receiving RF broadband signals. Like the power amplifier 235, however, the antenna 240 employed with a transceiver of the present invention is not limited to any particular type.

As illustrated in FIG. 2, the varying operations of the data source 215, data coder 220, modulator 225, header generator 230, and RF power amplifier 235 are controlled by transmitter control logic 245. The transmitter control logic 245 may be composed of a combination of logic circuits including, but not limited to, an application-specific integrated circuit (ASIC), a field programmable gate array (FPGA) and a programmable gate array (PGA). In an exemplary embodiment of the present invention, the transmitter control logic 245 includes only conventional logic circuitry configured in a manner to provide the binary data transmission scheme disclosed herein.

The transceiver 200 illustrated in FIG. 2 also includes a receiver 210. The receiver 210 includes an antenna 250, which may be a broadband antenna, as discussed above, for receiving a binary data stream transmitted from a remote transceiver (for example, see the system 100 of FIG. 1). After receiving the data stream, the stream is fed into a low noise amplifier 255. In accordance with conventional practice, the low noise amplifier 255 is employed to amplify the received frequencies before they are passed through a filter (not illustrated), perhaps located within the low noise amplifier 255, to isolate the carrier frequency on which the binary data was directly modulated. However, it should be noted that the use of the low noise amplifier 255 and/or filter is not necessary to practice the principles of the present invention.

The filtered data stream is then input to a synchronizer 260. The synchronizer 260 decodes the header information previously appended on the binary data stream by the header generator 230. The decoded header information is interpreted by the synchronizer 260 and used to configure a demodulator 265 to demodulate the data stream to yield the binary data that has been transmitted. In a specific embodiment of the present invention, the synchronizer 260 interprets information such as the signaling rate, data size, and type of coding scheme used on the binary data. Once interpreted, the demodulator 265 is configured by the synchronizer 260 to demodulate the stream based on these decoded transmission parameters.

In an advantageous embodiment of the present invention, the receiver 210 not only decodes such parameters, but also determines whether certain parameters are optimized between the transmitter sending the data stream and the receiver 210. For example, the receiver 210 may determine whether the transmission rate of the data stream is too fast or too slow based not only on the receiver 210 itself, but also on transmission conditions, such as channel interference and delay spread of the transmitted stream. If the header information informs the receiver 210 that the transmission rate the transmitter is using is too fast given all the conditions, the receiver 210, if coupled to a transmitter, will generate a feedback signal. In such an embodiment, the transmitter attempting to send the data stream receives the feedback signal, with a neighboring receiver, and adjusts the transmission parameters to facilitate the receiver's 210 current situation. Such an embodiment was described with reference to FIG. 1.

In a related embodiment, the transmitter attempting to send the data stream to the receiver 210 may transmit the new parameters in a new header so that the receiver 210 may determine whether the adjusted parameters now optimize the overall transmission. In yet another embodiment, a transmitter and receiver may engage in such feedback communication multiple times, both before data transfer begins and during a long transmission, to continuously optimize the complete data transmission. In this embodiment, the adaptive feedback provided by the data coder/header generator of a transmitter and the synchronizer of a receiver results in a continuous and adaptive optimization of a transmission between the two. Those skilled in the pertinent art will understand that optimizing data transmission, for instance, by adjusting the transmission rate so that the maximum rate available is sought, typically results in an efficient and quick data transfer situation. A specific embodiment of the adaptive feedback capability of transceivers constructed according to the present invention is discussed in greater detail with reference to FIGS. 3-6.

Once the receiver 210 and the sending transmitter have adaptively adjusted the transmission parameters, the transmitter will start transmitting the data stream. Because the synchronizer 260 has configured the demodulator 265 based on the established parameters, the demodulator 265 may correctly demodulate the stream. The demodulated data is then fed into a data decoder 270 that decodes the binary data for appropriate use. In an embodiment where a data coder, such as the data coder 220 discussed above, has encoded the binary data bit-for-bit, the data decoder 270 may decode the bit-for-bit encoding to arrive at the original binary data. Regardless of the type of decoding performed by the data decoder 270, the decoded data is transferred to a data sink 275 for appropriate use. For example, the data sink 275 may include a wireless computer waiting to receive the binary data before proceeding with a specific operation. Of course, as with the data source 215 discussed above, the data sink 275 is not limited to any particular device in need of the binary data.

Referring now to FIG. 3, illustrated is one embodiment of a slot sequence employed by a transmitter sending a binary data stream during a training sequence with a receiver, in accordance with the principles of the present invention. The illustrated slot sequence is an exemplary slot sequence for a 100 Mb/s maximum transmission rate in a 60 GHz frequency band. For a maximum rate of 100 Mb/s, a slot time of 10 ns may be used, resulting in a bandwidth of approximately 200 MHz. In addition, an exemplary embodiment with a maximum of 32 slots is discussed herein, which means the data transmission rate may be scaled down to about 8 Mb/s, if adverse channel conditions require. In short, in the illustrated embodiment, a transmission rate range of 100 Mb/s to 8 Mb/s is available, given the above-mentioned conditions and depending on channel conditions.

A training sequence according to the principles of the present invention consists of a gain-setting period and a time-distortion detection period. During the gain-setting period, a transmitter according to the present invention begins by transmitting 1024 slots where the transmitter is ON followed by 32 slots where the transmitter is OFF. During the time distortion detection period, the transmitter begins with transmitting 32 slots with a logical ONE and then 32 slots with a logical ZERO. The 32 ONE slots represent the slowest transmission rate (8 Mb/s in this embodiment), and may be transmitted multiple times, if desired, as illustrated by the first four blocks in the slot sequence in FIG. 3 (viewed from left to right). Then, the transmitter transmits 16 slots with logical ONEs and then 16 slots with logical ZEROs, multiple times if desired. This stage of the training sequence represents a faster transmission rate than the previous rate, and is illustrated in fifth through eighth blocks in the slot pattern of FIG. 3. The transmitter continues to increase the represented transmission rate by decreasing the number of ON/OFF slots in the gain-setting period, as illustrated by the decreasing number of slots in the latter blocks of the slot sequence in FIG. 3.

From the beginning of the gain-setting sequence, while the transmitter is transmitting the multiple ONE/ZERO slot sequences, a receiver intended to receive the binary data transmission is receiving and processing the sequence. To establish the maximum transmission rate (represented by the lowest usable transmitted slot sequence) that the receiver can receive based on the conditions present on the RF channel to be used during transmission, the receiver transmits a feedback signal to the transmitter to establish a specific transmission rate as one of several transmission parameters. In one advantageous embodiment, the feedback signal is transmitted from the receiver to the first transmitter immediately after the transmission of the first transmitter has been completed. Depending on conditions, more than one of these transmission-with-feedback cycles may be needed to establish the optimum transmission rate.

More specifically, to provide feedback from a receiver to a transmitter, each transmission typically consists of the sequence: Header, Data. Each Header typically consists of: training (gain setting+time distortion detection), rate signaling field, code selection field, and a start of data field. Data typically consists of the actual data followed by a suitable error detection mechanism such as a cyclic redundancy check (CRC) system that is well known in the data communications field. The following situation provides an example of a typical sequence performed according to the principles of the present invention. Further examples follow to further describe embodiments of the present invention.

Station A sends at 6.25 Mb/s to Station B a sequence with the rate set to 6.25 Mb/s. The data portion includes information that represents a request to send 100 Mb of data. The code and length fields are set as required. Station B receives the sequence and decides from the processing of the time distortion detection period that channel conditions allow a 25 Mb/s transfer rate. Station B sends back a transmission sequence at 6.25 Mb/s with the rate field set to 6.25 and the data field having information representing that a rate of 25 Mb/s is good, please start the transmission. Station A receives this, and proceeds with transmission of the data. The data is sent in transmission sequences that consist of the standard header with the rate field set to 25 Mb/s, the length field set to 64 Kb and a data field that contains a code indicating that "the data directly follows", and then followed by a suitable error check, such as a CRC.

Data transmission may occur in large chunks, for instance, 64 Kbits. In such embodiments, after every chunk, Station B sends back how it received the data and if the rate may be increased. In cases where the data was not received correctly, the receiver will signal back that the rate should be lowered. Similarly the code type may be changed by any message, with the selection being driven from any errors noted by the receiver. In addition, this process may be sped up by inserting time distortion detection sequences at regular intervals in the data stream. In yet another embodiment, the system may be made more responsive to changes in the transmission conditions by keeping the size of the data chunks relatively small. Moreover, the established transmission rate may also be part of the header information, as discussed in greater detail above.

This binary technique of an adaptive feedback between a receiver and a transmitter works to ensure an optimum data transmission rate. In addition, as mentioned above, this gain-setting portion of the training sequence may occur only once, prior to commencing transmission of the time distortion detection pattern, or may occur many times throughout the transmission to adaptively adjust the transmission rate throughout the data transfer. The time-distortion detection portion of the training sequence allows the receiver to detect the maximum signaling rate the transmission medium will support.

Turning now to FIG. 4, illustrated is one embodiment of a sequence establishing the signaling rate field between a transmitter and a receiver for a particular data transmission that is to occur. In the illustrated embodiment, "nn" represents a particular signaling rate established by the transmitter, such as those set forth in Table 1. It should be noted that the signaling rate is defined in terms of the slot period (e.g., 10 ns in this embodiment). In an advantageous embodiment, the receiver may set a maximum signaling rate, as described in detail above.

TABLE 1

| nn | Rate |
|----|------|
| 32 | 3.125 Mb/s |
| 16 | 6.25 Mb/s |
| 8 | 12.5 Mb/s |
| 4 | 25 Mb/s |
| 2 | 50 Mb/s |
| 1 | 100 Mb/s |

Another transmission parameter that may be established using the header is the specific coding scheme used to encode the data. Without the coding scheme, a receiver would be unable to decode the incoming data for use as intended. Referring to FIG. 5, illustrated is one embodiment of a sequence establishing the coding control field between a transmitter and a receiver for a particular data transmission. In this embodiment, the type of coding scheme employed by the transmitter may also be established using a binary format.

More specifically, binary values may be assigned to indicate to a receiver that a particular coding scheme has been employed on the data stream. Table 2 sets forth an exemplary embodiment of this facet of the present invention where convolutional and turbo coding are the available choices. Those who are skilled in the art understand the various types of coding schemes, as well as the intricacies involved with each such scheme, so that discussion will not be presented here. In addition, those who are skilled in the art will understand that establishing a coding scheme according to the principles of the present invention is not limited to the schemes discussed herein. Rather, the present invention is broad enough to encompass any type of coding scheme employed by transmitters and receivers during data transmission.

TABLE 2

| nn | Type of Coding |
|----|----------------|
| 32 | convolutional coding rate ½ |
| 16 | convolutional coding rate ¾ |
| 8 | turbo coding rate ½ |
| 4 | turbo coding rate ¾ |
| 2 | no coding |

Yet another transmission parameter that may be established during the time-distortion period is the start of data signaling field. Turning now to FIG. 6, illustrated is one embodiment of a slot pattern that may be used to establish a start of data signaling field, in accordance with the present invention, between a transmitter and a receiver. The start of data signaling field may be employed by transceivers constructed according to the principles of the present invention to establish specific information directly pertaining to the data to be sent. For example, in an advantageous embodiment, the start of data signaling field may establish the size of the data to be transmitted. More specifically, the start of data signaling field may be used by a transmitter to inform a receiver of the exact length of a portion of binary data, for instance, a data packet, to be transmitted.

In an exemplary embodiment, the data length is represented by a fixed pattern of seven periods. The length of each period corresponds to one bit at the data signaling rate, as shown in FIG. 6. For 25 Mb/s, the period lasts 4 slot times, etc. The first and last periods (or bits) are set to ZERO. The middle 10 bits encode the data length in terms of a number of pre-defined data sizes. The definition of such data sizes is outside the scope of the present invention. nn is set equal to the nn value used to establish the rate signaling field, as discussed with reference to FIG. 4. However, the value for nn set for the middle five periods is not determinative of the size of the data. Rather, whether each slot is ON or OFF is determinative. More specifically, the five middle slots may be set either ON or OFF to set forth a binary value used to represent the size of the data to be transmitted. Table 3 sets forth some examples of slot patterns establishing specific sizes for the binary data to be transmitted.

Those who are skilled in the art understand how ON or OFF slots may represent a binary 1 or 0 and, therefore, denote a specific binary period or bit value. Of course, the present invention is not limited to the number of bits or the data sizes set forth in Table 3, and is broad enough to encompass any data size capable of being represented in a binary format. In addition, although only five slots ($2^5$ possibilities) are reserved for establishing data size, the present invention is broad enough to encompass any number of periods/bits for use in establishing data size.

TABLE 3

| Bit 1 | Bit 2 | Bit 3 | Bit 4 | Bit 5 | Logic Value | Multiplier (buswidth) | Total Data Size |
|---|---|---|---|---|---|---|---|
| OFF | OFF | OFF | OFF | ON | 1 | 64 bytes | 64 bytes |
| OFF | OFF | OFF | ON | OFF | 2 | 64 bytes | 128 bytes |
| OFF | OFF | OFF | ON | ON | 3 | 64 bytes | 192 bytes |

By providing a binary data transmission system capable of directly transmitting binary data using RF signals, the present invention provides several benefits over the prior art. For instance, in embodiments employing s training session as discussed above, the adaptive feedback capability of the present invention provides for optimum transmission rates because a transmitter and receiver may constantly work together during a transmission to establish the most efficient transmission rate available, taking into consideration the channel condition and the capabilities of the receiver itself. Those skilled in the art understand that by optimizing data transmission, spectrum is not "wasted" during a transmission by transmission rates slower than needed. Of course, optimum data transmission generally results in higher overall efficiency of the LAN or other network environment.

In addition, a binary data transmission scheme as disclosed herein can also reduce or eliminate the complex circuitry and components often associated with conventional analog RF transmission schemes. As discussed above, by reducing circuit and component complexity, the manufacturing and operating costs associated with transmission components, as well as the overall size of each device, may be reduced. Specifically, the high quality devices often required with high-speed analog data transmission systems tend to be harder to design and expend greater electrical energy during operation. Moreover, the binary data transmission capabilities provided by the present invention are employable in almost any data transmission situation, while still retaining benefits such as those described above.

Although the present invention has been described in detail, those skilled in the art should understand that they can make various changes, substitutions and alterations herein without departing from the spirit and scope of the invention in its broadest form.

What is claimed is:

1. A local-area network (LAN) transceiver, comprising:
   a data coder configured to receive and encode binary data;
   a modulator configured to employ a training sequence to establish optimum transmission parameters of said encoded data and to employ said encoded data to modulate a radio-frequency carrier using binary modulation, said training sequence including a time distortion detection portion configured to determine a maximum tolerable time distortion in a transmission path of said modulated radio-frequency carrier; and
   a transmitter that amplifies and transmits said modulated carrier.

2. The LAN receiver recited in claim 1, wherein said binary modulation comprises enabling said carrier for a time period of an integer multiple of a minimum time period.

3. The LAN receiver recited in claim 2, wherein said training sequence includes a gain setting portion.

4. The LAN receiver recited in claim 3, wherein said gain setting period comprises enabling said carrier for a time period that is a power of two times said minimum time period.

5. The LAN receiver recited in claim 2, wherein said transmitter is further configured to employ a rate signaling field, a code selection field, and a start of data field.

6. The LAN receiver recited in claim 5, wherein said rate signaling field comprises an OFF time period comprising a fixed integer power of two times said minimum time period and an ON time period comprising a variable integer power of two times said minimum time period, wherein said variable power of two encodes a signaling rate.

7. The LAN receiver recited in claim 5, wherein said code selection field comprises an OFF time period comprising a fixed integer power of two times said minimum time period and an ON time period comprising a variable integer power of two times said minimum time period, wherein said variable power of two encodes a coding type.

8. The LAN receiver recited in claim 5, wherein said data signaling field comprises an OFF time period comprising a fixed integer power of two times said minimum time period and a sequence of ON-OFF time periods forming a binary value that encodes a length of a data block following said training sequence.

9. The LAN receiver recited in claim 1, wherein said time distortion detection portion comprises a series of ON-OFF time periods, said series subdivided into a plurality of subgroups comprising ON-OFF time periods of equal duration, wherein an equal duration of a previous subgroup is longer than an equal duration of a subsequent subgroup.

10. The LAN receiver recited in claim 9, wherein an equal duration of a previous subgroup is a power of two greater than an equal duration of a subsequent subgroup.

11. A method of transmitting digital data in a local-area network (LAN), comprising:
   encoding binary data;
   employing said encoded data to modulate a radio-frequency carrier using on-off keying;
   employing a training sequence to cooperatively negotiate with a receiver to determine optimum parameters for transmitting said data to said receiver, said training sequence including a time distortion detection portion configured to determine a maximum tolerable time distortion in a transmission path of said modulated radio-frequency carrier; and p1 transmitting said modulated carrier.

12. The method recited in claim 11, wherein said on-off keying comprises enabling said carrier for a time period of an integer multiple of a minimum time period.

13. The method recited in claim 12, wherein said training sequence includes a gain setting portion.

14. The method recited in claim 13, wherein said gain setting period comprises enabling said carrier for a time period that is a power of two times said minimum time period.

15. The method recited in claim 12, wherein said training sequence includes a rate signaling field, a code selection field, and a start of data field.

16. The method recited in claim 15, wherein said rate signaling field comprises an OFF time period comprising a fixed integer power of two times said minimum time period and an ON time period comprising a variable integer power of two times said minimum time period, wherein said variable power of two encodes a signaling rate.

17. The method recited in claim 15, wherein said code selection field comprises an OFF time period comprising a fixed integer power of two times said minimum time period and an ON time period comprising a variable integer power of two times said minimum time period, wherein said variable power of two encodes a coding type.

18. The method recited in claim 15, wherein said data signaling field comprises an OFF time period comprising a fixed integer power of two times said minimum time period and a sequence of ON-OFF time periods forming a binary value that encodes a length of a data block following said training sequence.

19. The method recited in claim 11, wherein said time distortion detection portion comprises a series of ON-OFF time periods, said series subdivided into a plurality of subgroups comprising ON-OFF time periods of equal duration, wherein an equal duration of a previous subgroup is longer than an equal duration of a subsequent subgroup.

20. The method recited in claim 19, wherein an equal duration of a previous subgroup is a power of two greater than an equal duration of a subsequent subgroup.

* * * * *